(No Model.)
S. LEMSTRÖM.
PROTECTING GROWING VEGETABLES FROM NIGHT FROSTS.
No. 525,989. Patented Sept. 11, 1894.
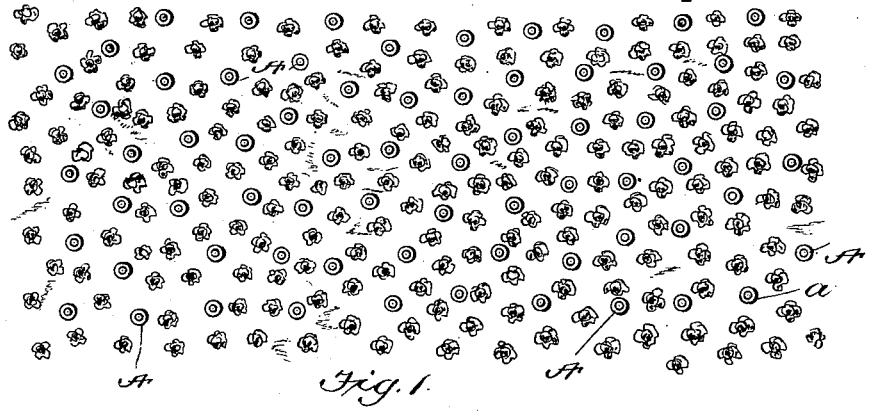
Fig. 1.
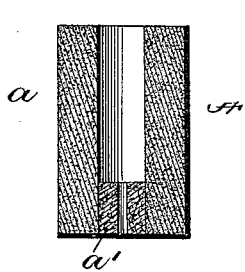
Fig. 2.
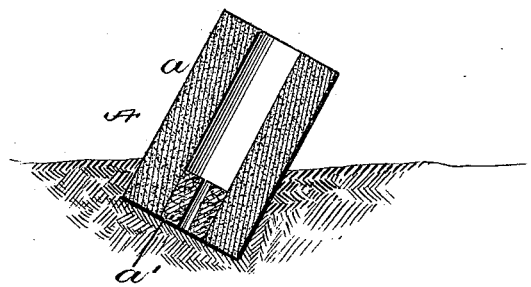
Fig. 3.
Fig. 4.
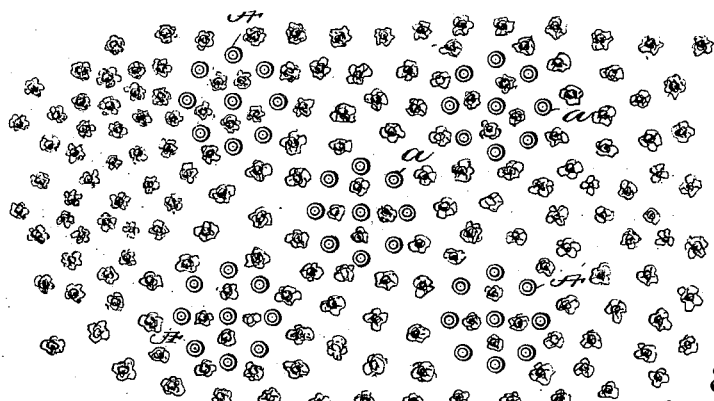
Witnesses
Inventor
Attorney

UNITED STATES PATENT OFFICE.

SELIM LEMSTRÖM, OF HELSINGFORS, FINLAND.

PROTECTING GROWING VEGETABLES FROM NIGHT FROSTS.

SPECIFICATION forming part of Letters Patent No. 525,989, dated September 11, 1894.

Application filed October 20, 1893. Serial No. 488,683. (No specimens.)

*To all whom it may concern:*

Be it known that I, SELIM LEMSTRÖM, a subject of the Czar of Russia, as Grand Duke of Finland, residing at Helsingfors, Finland, have invented certain new and useful Improvements in Protecting Growing Vegetables and the Like from Night Frosts; and I do hereby declare the following to be a full, clear, and exact description of the invention, such as will enable others skilled in the art to which it appertains to make and use the same.

This invention contemplates the protection of growing plants, vegetables and the like, from the injurious action of night-frosts whereby the same are prevented from coming in contact with the plants or vegetables or in any way injuring the vegetation. After extensive study and experiment concerning the causes of the night-frosts and the circumstances of their appearance I have found that the quantity of heat necessary to prevent the damage they cause is in reality very small and that consequently they can be easily obviated. The principal cause of the night-frost is the radiation of heat from the ground and the growing plants thereon. A rapid radiation occurs only during a clear sky and relative dryness of the air. When the air and the aqueous vapor in it do not radiate heat in a perceptible quantity, the air becomes cooled only through its contact with the earth and the plants thereon, or, in general, with solid bodies. Hence only the lower layer of air is cooled and the temperature, if a perfect calm prevails, increases from the ground upward. The cooled air begins to run downward first from the tops of the vegetables. If the radiation is strong enough the cooling continues and the temperature in the surrounding air falls below the freezing point. If now the air is so dry that the freezing point may be reached before the dew point is attained the conditions of damage by night-frost are threatening. If, on the contrary, the air is moist and contains much aqueous vapor the latter begins to condense and to deliver heat to the plants but in that case the radiation is increased because the liquid water radiates heat in a high degree. The problem therefore is (*a*) to diminish the radiation, or (*b*) to mix the upper warmer layer of air with the lower cold layer, or (*c*) to carry away the lowest cooled layer of air and cause the upper warm air to travel downward.

My studies and experiments have been prosecuted with the view of attaining a method both effective and rational for producing not only smoke but also aqueous vapors and artificial currents or movements in the air in all directions, especially ascending currents for intermingling the air layers and soaking or carrying away the cold air.

To these ends my invention comprises the means, substantially as hereinafter fully set forth and particularly pointed out in the claims.

In the accompanying drawings:—Figure 1 is a diagrammatical view of a portion of a field provided with my improved means for dispelling night-frosts. Fig. 2 is a vertical sectional view of one of the torches or burning mediums. Fig. 3 is a similar view showing the position occupied by the torch when in use. Fig. 4 is a second diagrammatical view.

Referring to the drawings, A designates my frost-torch, a series of which is placed throughout the field at suitable distances apart. Each torch consists of a tube or cylinder *a* made of well-dried mud and within this tube or cylinder is placed a block *a'* of kindling compound. The tube or cylinder *a* must be constructed of well molded mud entirely free of all foreign substances, such as wood, roots and the like. The kindling block *a'* consists of a compound of well molded mud; powdered wood-coal; resin and tar, the relative quantities being substantially as follows:— moist mud, one hundred pounds; wood-coal, fifteen pounds; resin, ten pounds; tar, five pounds. These ingredients are thoroughly mixed into a homogeneous compound, from which the circular blocks are formed by any suitable means. Before inserting the kindling blocks into the tubes or cylinders they are first moistened with liquid petroleum and after insertion are kindled or lighted by applying a flame thereto. The kindling blocks at first burn with a flame but afterward they begin to carbonize and soon to glow, giving off so much heat that the tubes or cylinders A, which occupy an inclined position, begin to bake.

The advantages of this form of "torch" are that it is handy and inexpensive; can be easily transported and readily kindled; and the kindling block will burn slowly and produce much smoke, vapor and heat. Then again the fire is concentrated and there is no danger of the same spreading. The material for the tubes may be changed according to the resources of the country.

In the preferred method of carrying out my invention the torches are placed at suitable distances apart and each torch is made to occupy a slanting or sloping position, small holes or openings being preferably formed in the soil to insure the proper position of the torches. More specifically stated the torches may be located as follows:—in a field of ten hectares about eleven hundred torches; five hectares six hundred to six hundred and fifty torches; three hectares four hundred to four hundred and fifty; one hectare one hundred and sixty to two hundred and ten and so on relatively. Within an hour after ignition the tubes or cylinders are each one glowing mass, giving forth heat and aqueous vapor in all directions. As in this method warm moisture has predominant influence, it is advisable to increase its production by heaping damp moss, if such is to be had, or even wet grass on the glowing torches. The burning of the torches will create artificial clouds or movements in the air serving to supply constantly a quantity of heat necessary for the raising of the temperature of the cooled layer of air.

By means of the kindling blocks and inclosing tubes or cylinders constituting the torches, as herein described, I am enabled to produce artificial clouds consisting of smoke and vapor which as hereinbefore pointed out will successfully dispel night-frosts and afford protection to the growing vegetables. Another method of obtaining the same result but in a slightly different way is that preferably employed in large fields in which as large a number of torches is not necessary. In a field, say of five hundred hectares, about five areas of ten hectares each are divided off, the same being situated as symmetrically as possible and upon this space are placed say two thousand torches which are to be lighted simultaneously. It is evident that five currents of ascending warm air are produced within a section of about one hundred thousand square meters each. These currents of air cause a disturbance of the equilibrium of the air, carry away the cold layers of air and by the produced smoke and aqueous vapors, the radiation of heat is diminished. This arrangement is shown in Fig. 4.

The advantages of my invention are apparent and it will be readily seen that by means thereof I am enabled to successfully prevent injury or damage to growing vegetables by the contact of night frosts therewith, and the means employed are simple and inexpensive and capable of practical use.

I claim as my invention—

1. A torch for dispelling night-frosts from vegetables and the like having a kindling compound of mud, wood-coal, resin and tar, as set forth.

2. A torch for dispelling night-frosts from vegetables and the like, comprising an outer tube or cylinder of hardened mud or its equivalent, and a kindling block located therein having carbonaceous ingredients, as set forth.

3. A torch for dispelling night-frosts from vegetables and the like, comprising an outer tube or cylinder of hardened mud, and a kindling block located therein and composed of mud, wood-coal, resin and tar moistened with petroleum as set forth.

In testimony whereof I have signed this specification in the presence of two subscribing witnesses.

SELIM LEMSTRÖM.

Witnesses:
J. NOTA MCGILL,
WM. S. HODGES.